Nov. 21, 1944.   L. G. KRUG   2,363,110
OIL SEAL
Filed Dec. 3, 1941   2 Sheets-Sheet 1
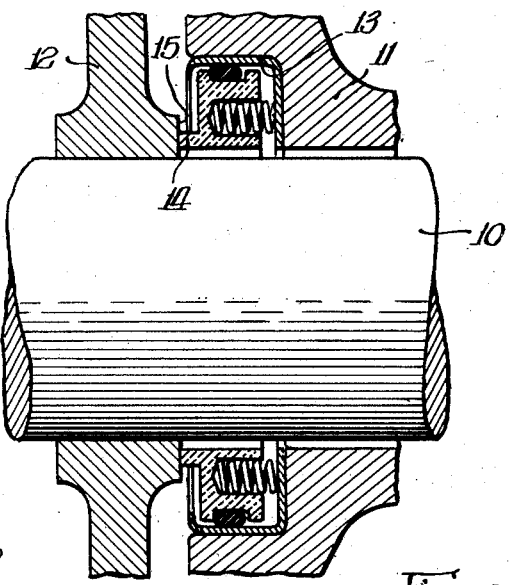
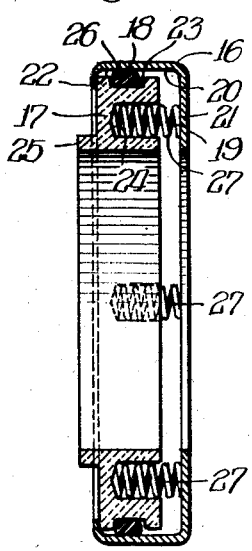
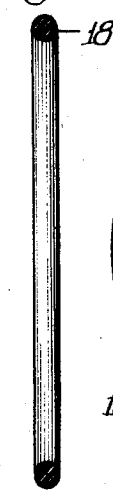
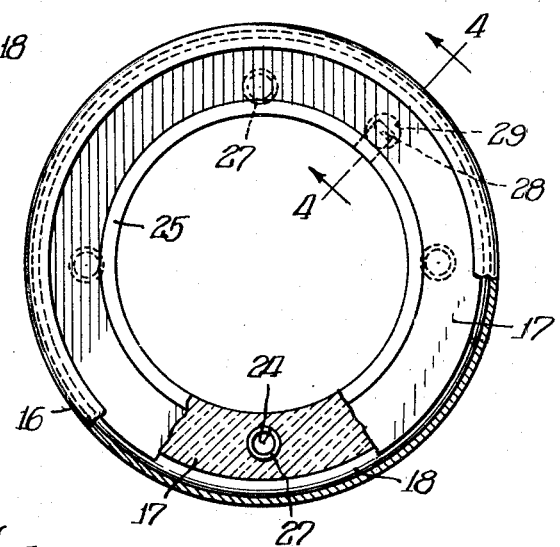
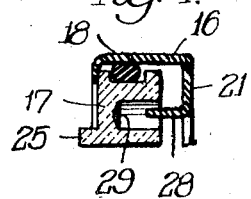
INVENTOR.
Louis G. Krug,
BY Cromwell, Greist + Warden
attys.

Nov. 21, 1944.    L. G. KRUG    2,363,110
OIL SEAL
Filed Dec. 3, 1941    2 Sheets-Sheet 2
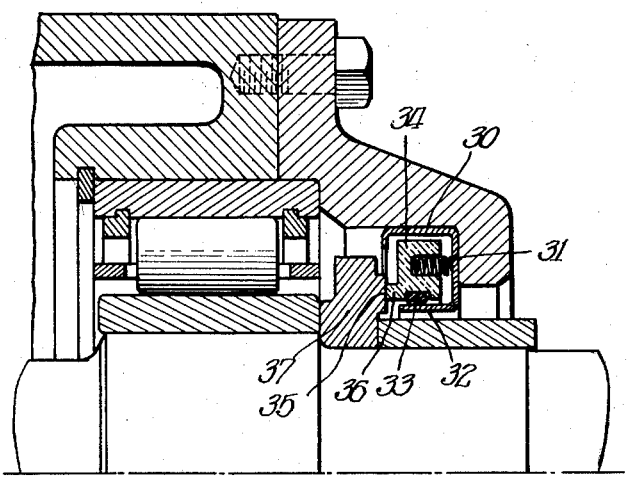
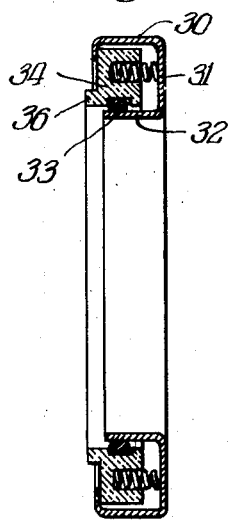
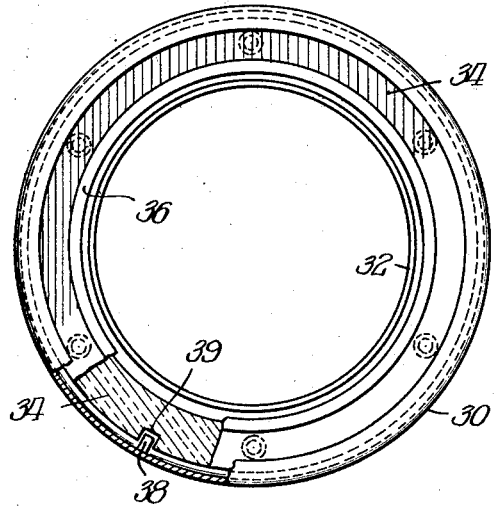
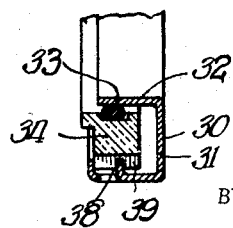
INVENTOR.
Louis G. Krug,
BY Cromwell, Greist + Warden
Attys.

Patented Nov. 21, 1944

2,363,110

UNITED STATES PATENT OFFICE 2,363,110

OIL SEAL

Louis G. Krug, Chicago, Ill., assignor to Chicago Rawhide Manufacturing Company, Chicago, Ill., a corporation of Illinois Application December 3, 1941, Serial No. 421,504

5 Claims. (Cl. 286—7)

The present invention is concerned with end thrust seals of the type ordinarily used about a shaft between two axially separated members for sealing off the space present between such members.

The object of the invention is to provide an improved end-thrust seal, in the form of a self-contained unit, which will operate effectively to prevent passage of the oil, grease, gas or other fluid with which used, and which is inexpensive to manufacture and easy to install.

Other objects and advantages will be apparent to those skilled in the art upon a full understanding of the novel features of the improved seal.

Two different embodiments of the invention are presented herein for the purpose of exemplification, but it will of course be appreciated that the invention is capable of being embodied in various other structurally modified forms coming equally within the scope of the appended claims.

In the accompanying drawings:

Fig. 1 is a diametric section through an end-thrust seal constructed in accordance with the invention, showing the same installed about a shaft between two axially spaced and relatively rotatable machine parts;

Fig. 2 is a similar section through the seal, showing the same in its expanded condition prior to installation;

Fig. 3 is a face view of the front end of the seal, with portions broken away;

Fig. 4 is a section through one side of the seal, taken on the line 4—4 of Fig. 3;

Fig. 5 is a section through the compressible band used in the seal; and

Figs. 6 to 9 inclusive are views, corresponding respectively to Figs. 1 to 4 inclusive, of a modified seal structure constructed in accordance with the invention.

The seal structure shown in Figs. 1 to 5 inclusive will first be described. As will be observed in Fig. 1, the seal is adapted to be positioned about a shaft 10 between one end of a housing 11 through which the shaft projects and a part 12 which turns with the shaft. The seal is press-fitted into a recess 13 in the housing and is provided with a sealing portion 14 which engages with an annular abutment 15 on the part 12 in freely rotatable but fluid-tight engagement with such abutment. In the particular organization shown in Fig. 1 the oil or other fluid under pressure may be advantageously contained within the housing 11 between the latter and the shaft 10.

The seal includes a hollow annular casing 16, a sealing ring 17, a resiliently compressible band 18 and spring means 19. The hollow annular casing 16 is characterized by a cylindrical surface 20 on the interior of the same, by a radially extending wall 21 at the rear end of the casing, and by a relatively narrow retaining flange 22 at the front end of the casing. The sealing ring 17 is located in the casing and is characterized by a radially opening annular groove 23 in opposition to the cylindrical surface 20, by a plurality of circumferentially spaced axially opening pockets 24 in the rear face of the ring in opposed relation to the rear wall 21, and by an annular bearing rib 25 at the other end of the casing. The rib 25, which constitutes the previously mentioned sealing portion 14, projects from the casing past the retaining flange 22. The band 18, which may be made of rubber, synthetic rubber, or other resiliently compressible material not affected by the fluid with which the seal is to be used, is located in the groove 23 and is positioned under compression between the bottom of the groove and the cylindrical surface 20. When the seal is in its operative position, with the nose 25 of the same pressed back slightly, the compressed band 18 is designed to assume a position in wedged engagement with the rearwardly facing annular shoulder 26 which forms the forward side wall of the groove 23, with the pressure of the fluid behind the band acting to hold the same in abutment with such shoulder. The spring means 19 consists of a plurality of individual coil springs 27 which are located in the pockets 24 and are compressed between the bottoms of the pockets and the rear wall 21 of the casing. The band 18, prior to being assembled with the other parts of the seal, is preferably though not necessarily of round cross section, as shown in Fig. 5. Its outside diameter is slightly larger than the diameter of the cylindrical surface 20 on the interior of the casing, and its inside diameter is slightly smaller than the diameter of the bottom of the groove 23.

The sealing ring 17 is of course somewhat larger than the shaft 10, whereby to permit the latter to turn freely without affecting the sealing ring. The resiliently compressed band 18 will normally prevent the sealing ring 17 from turning with respect to the casing 16, but under certain conditions, as with high speeds or abnormally high fluid pressure, the tendency for the sealing ring to turn will overcome the frictional resistance offered by the band 18 and will in a short time injure the band to the extent of making the seal ineffective. This is prevented by the provision of a tongue 28 on the casing which projects into a socket 29 in the sealing ring, in circumferentially interlocked association with the latter.

In the modification shown in Figs. 6 to 9 inclusive the casing 30 of the seal is provided at the inner edge of its rear wall 31 with a tubular reentrant flange 32. The resiliently compressible band 33, instead of being located between the outer periphery of the sealing ring 34 and the casing, is located between the inner periphery of the sealing ring and the reentrant flange 32. In other respects the two seals are substantially the same. This last described seal permits the fluid pressure to be applied outwardly of the ground sealing joint 35, directly against the front face of the seal, without acting to force the nose 36 of the seal away from the annular abutment 37 on the shaft. This is possible because of the fact that the fluid pressure is permitted in this seal construction to get around the outside of and behind the sealing ring, with the result that the greater the fluid pressure the greater will be the pressure at the sealing joint 35. In this reentrant flange type of seal, the sealing ring 34 can be prevented from turning with respect to the casing 30 by providing a tongue 38 on the inside of the casing which projects inwardly into circumferentially interlocked engagement with a slot 39 in the outer periphery of the sealing member.

I claim:

1. A self-contained rotary end-thrust seal comprising a hollow annular casing adapted for rigid fluid-tight association with one member in encompassing relation to a second relatively rotatable member, which casing is characterized by a cylindrical surface on the interior of the same, by a radially extending wall at the rear end of the casing, and by a relatively narrow annular retaining flange at the front end of the casing; a sealing ring in the casing, which ring is spaced inwardly from the cylindrical surface on the interior of the casing and is characterzed by a radially opening annular groove in opposed relation to said cylindrical surface, by a plurality of circumferentially spaced axially opening pockets in one end of the ring in opposed relation to said rear wall, and by an annular bearing rib at the other end of the casing, which rib projects from the casing past said retaining flange and is adapted for end-thrust engagement with an annular abutment on said second relatively rotatable member; a band of resiliently compressible material located in said groove, which band supports the sealing ring in spaced but centered relation to the casing and is positioned under compression between the bottom of the groove and the cylindrical surface on the interior of the casing; and coil springs located in said pockets and compressed between the bottoms of the pockets and the rear wall of the casing.

2. A self-contained rotary end-thrust seal comprising a hollow annular casing adapted for press-fit insertion in a recess in one member in encompassing relation to a second relatively rotatable member, which casing is characterized by a cylindrical surface on the interior of the same, by a radially extending wall at the rear end of the casing, and by a relatively narrow annular retaining flange at the front end of the casing; a sealing ring in the casing, which ring is spaced inwardly from the cylindrical surface on the interior of the casing and is characterized by a radially opening annular groove having a substantially cylindrical bottom in opposed relation to said cylindrical surface, by a plurality of circumferentially spaced axially opening pockets in one end of the ring in opposed relation to said rear wall, and by an annular bearing rib at the other end of the casing, which rib projects from the casing past said retaining flange and is adapted for end-thrust engagement with an annular abutment on said second relatively rotatable member; a band of resiliently compressible material located in said groove, which band supports the sealing ring in spaced but centered relation to the casing and is of less width than the groove, and is positioned under compression against one side of the groove between the cylindrical bottom of the latter and the cylindrical surface on the interior of the casing; and coil springs located in said pockets and compressed between the bottoms of the pockets and the rear wall of the casing.

3. A self-contained rotary end-thrust seal comprising a hollow annular casing adapted for rigid fluid-tight association with one member in encompassing relation to a second relatively rotatable member, which casing is characterized by a cylindrical surface on the interior of the same and by a radially extending wall at the rear end of the casing; a sealing ring in the casing, which ring is spaced inwardly from the cylindrical surface on the interior of the casing and is characterized by a rearwardly facing annular shoulder on its periphery adjacent said cylindrical surface and by an annular bearing rib at the front end of the casing for end-thrust engagement with an annular abutment on said second relatively rotatable member; a band of resiliently compressible material which supports the sealing ring in spaced but centered relation to the casing and is positioned under compression between the sealing ring and the cylindrical surface on the interior of the casing in engagement with the annular shoulder on the ring; compression spring means located between the sealing ring and the radially extending rear wall of the casing; means extending from the casing into engagement with the sealing ring for limiting the forward movement of the latter under the action of said spring means; and other means extending from the casing into engagement with the sealing ring for preventing rotation of the latter.

4. A self-contained end-thrust seal comprising a hollow annular casing adapted for rigid fluid-tight association with one member in encompassing relation to a second relatively rotatable member, which casing is characterized by a cylindrical surface within the interior of the same, by a radially extending wall at the rear end of the casing, and by a relatively narrow radially extending annular retaining flange at the front end of the casing; a sealing ring in the casing, which ring is spaced radially from said cylindrical surface in concentric relation to the same and is characterized at its front end by a relatively narrow annular bearing rib of less diameter than said retaining flange; said bearing rib projecting forwardly from the casing past said retaining flange for end-thrust engagement with an annular abutment on said second relatively rotatable member; said sealing ring being further characterized by a radially opening annular groove opposite said cylindrical surface, the front wall of said groove extending abruptly toward said cylindrical surface but terminating a substantial distance therefrom, and the bottom of said groove extending in the same general direction as said cylindrical surface; a resiliently compressible band of less width than the groove positioned in the groove in a partially projecting position and compressed in the groove between the bottom of the latter and said cylindrical surface; said band constituting the sole means of support for the sealing ring in a radial direction and acting to support the same in centrally spaced but tiltable relation to the casing with the band in fluid-tight engagement with the front wall of the groove; spring means located between the sealing ring and the rear wall of the casing for projecting the sealing ring forwardly; said sealing ring being provided with an annular portion of larger diameter than said retaining flange, which portion engages with the inside of the latter to stop the forward movement of the sealing ring within the casing under the action of said spring means with the axis of the sealing ring coincident with the axis of the casing; and means extending from the casing into loose but circumferentially interlocked engagement with the sealing ring for preventing rotation of the sealing ring in all positions of the latter.

5. In an oil seal, an annular casing for rigid fluid-tight association with one member in encompassing relation to a second relatively rotatable member, said casing being characterized by an outer wall, by an inwardly extending rear wall, by a relatively narrow inwardly extending front wall, and by a cylindrical packing-engaging surface; an axially movable sealing ring telescopically positioned within the casing, said ring being characterized by a forwardly facing surface which extends outwardly within the casing into axial registration with the front wall of the casing, by a rearwardly facing surface of greater area than said forwardly facing surface, by a cylindrical packing-engaging surface in opposition to the first mentioned cylindrical packing-engaging surface, and by an annular bearing rib, which rib is located at the front end of the ring with its base at the inner edge of said forwardly facing surface, and which rib projects forwardly through the front wall of the casing for rotary engagement with an annular abutment associated with said second relatively rotatable member; a band of resiliently compressible packing material positioned under compression between the two said cylindrical packing-engaging surfaces for closing off the space between said surfaces and supporting the axially movable sealing ring in spaced but centered relation to the casing; and spring means acting against the sealing ring to move the same forwardly; said rearwardly facing surface on the sealing ring being exposed within the casing through the partially open front end of the latter to the same oil pressure as that to which the said forwardly facing surface is exposed, whereby to create a pressure differential, and said band of packing material being similarly exposed to the same pressure, whereby to prevent the same from being transmitted rearwardly past the seal.

LOUIS G. KRUG.